United States Patent [19]

Murata et al.

[11] Patent Number: 5,365,258
[45] Date of Patent: Nov. 15, 1994

[54] COLOR IMAGE FORMING APPARATUS WITH PLURAL PHOTOCONDUCTOR DRUMS

[75] Inventors: Kazuyuki Murata, Tsuzuki; Takeshi Shimamoto, Hirakata, both of Japan

[73] Assignee: Matsushita Electric Industrial Co., Ltd., Osaka, Japan

[21] Appl. No.: 20,131

[22] Filed: Feb. 19, 1993

[30] Foreign Application Priority Data

Feb. 21, 1992 [JP] Japan .................. 4-034616

[51] Int. Cl.$^5$ .............. G01D 9/42; G01D 15/14; G03G 15/01
[52] U.S. Cl. ................... 346/108; 346/157; 346/160
[58] Field of Search .............. 346/108, 157, 160

[56] References Cited

U.S. PATENT DOCUMENTS

| | | | |
|---|---|---|---|
| 4,194,878 | 3/1993 | Murakami et al. | 346/108 |
| 4,591,903 | 5/1986 | Kawamura et al. | 346/160 X |
| 4,849,980 | 7/1989 | Shoji et al. | |
| 4,859,913 | 8/1989 | Genovese et al. | 346/160 X |
| 4,916,706 | 4/1990 | Ohashi | |
| 4,967,284 | 10/1990 | Yoshida et al. | 346/108 X |
| 4,979,129 | 12/1990 | Okubo et al. | 346/157 X |
| 4,987,426 | 1/1991 | Ota et al. | |
| 5,099,260 | 3/1992 | Sato et al. | 346/157 X |
| 5,191,361 | 3/1993 | Abe | 346/157 |
| 5,241,400 | 8/1993 | Itagaki | 346/157 X |

Primary Examiner—George H. Miller, Jr.
Attorney, Agent, or Firm—Ratner & Prestia

[57] ABSTRACT

A color image forming apparatus with plural photoconductor drums has a plurality of color image forming arrangements, each arrangement includes an image signal processor for processing an image signal for one of black, cyan, magenta and yellow, and for producing a modulated image signal, a semiconductor laser diode for emitting laser beam in accordance with the modulated image signal, a scanning device for scanning the laser beams on a photoconductor surface. The laser beam passes through a slit or an elongated opening provided between the semiconductor laser diode and the photoconductor surface for reforming the laser beam to have a cross-section shape of an ellipse with its short axis parallel to the laser scanning direction.

12 Claims, 13 Drawing Sheets

COLOR IMAGE FORMING APPARATUS WITH PLURAL PHOTOCONDUCTOR DRUMS

BACKGROUND OF THE INVENTION

1. Field of the Invention

The present invention relates to a color image forming apparatus with plural photoconductor drums for forming color images by modulating the power of plural lasers and exposing plural photoconductor drums.

2. Description of the Prior Art

As color laser beam printers and other color imaging technologies have become more common, demand for high resolution, excellent half-tone reproduction, and high speed processing and throughput has risen. Half-tone reproduction is achieved in these conventional color laser printers by pulse width modulation (PWM) of the laser beams.

The operation of a conventional color image forming apparatus is described below with reference to FIG. 12 showing a block diagram of a conventional laser modulation circuit, and FIG. 13 showing a timing chart of the laser modulation circuit in FIG. 12 using conventional pulse width modulation.

In this circuit, the digital/analog (D/A) converter 102 converts the raster scan digital image signal 101 to an analog image signal 103. The ½ frequency divider 104 ½-frequency divides the pixel clock 119 of the digital image signal 101 to output the screen clock 120. The pattern signal generators A 105, B 106, and C 107 generate and output the corresponding pattern signals A 108, B 109, and C 110 based on the screen clock 120. The period of the pattern signals A 108, B 109, and C 110 is twice that of the pixel clock 119, and the waveform of each signal is different.

The comparators 111, 112, and 113 compare the analog image signal 103 with the pattern signals A 108, B 109, andC 110, respectively, to output the corresponding pulse width modulated PWM signals A 121, B 122, and C 123. The density gradient detection circuit 116 detects the density gradient in the main scanning direction of the digital image signal 101, and outputs the density gradient detection signal 117. The PWM signals A 121, B 122, and C 123 and density gradient detection signal 117 are input to the selector 114, which selects one of the PWM signals A 121, B 122, or C 123 based on the density gradient detection signal 117 to output the PWM signal 115.

Referring to FIG. 13, the first pattern signal A 108 is a ramp wave with a right up-ramp. The second pattern signal B 109 is a chopping wave. The third pattern signal C 110 is a ramp wave with a right down-ramp. The density gradient detection circuit 116 shown in FIG. 12 detects both the direction and the magnitude of the density gradient of the image signal to determine which of the PWM signals should be selected by the selector 114. The bottom row in FIG. 13 shows the PWM signals selected by the selector 114.

This conventional pulse width modulation circuit can prevent a loss of resolution in text output and avoid jagged edge lines appearing in line art even when image signals containing text and line art are pulse width modulated even though the period of the pattern signal is twice the pixel clock. (cf. Japanese patent laid-open number H2-47973)

When forming color images, however, it is necessary to record, at least, cyan, magenta, and yellow color images to the recording medium, and a screening process is performed to assign a different screen angle to each color to avoid differences in the relative positions of these colors on the recording medium from affecting intermediate tones. Also, by the screening processing, the ratio of the overlapping color dots per a unit area is controlled to produce less registration error for each color on the recording medium. Because the formed image is a screen of discrete lines, however, differences in the registration error of each color on the recording medium result in a variable ratio between overlapping color areas. This results in inaccurate intermediate color tones.

This problem is amplified in a color image forming apparatus using plural laser and plural photoconductors to form a full color image by overlaying plural single-color images each formed by one of the plural lasers because it is extremely difficult to adjust the relative position of each color on the recording medium so that color tone shifts are not a problem. This difficulty is due to differences in the length of the laser beam path with each color, errors in the parallelism of the laser scan lines, transfer and positioning accuracy of the recording medium, positioning errors in the beam detector installation, and other factors related to the mechanical precision of the apparatus.

While methods using pseudo-screening combining dithering and pulse width modulation within the range of a single pixel have been developed (U.S. Pat. No. 5,081,528), a certain loss of resolution is inevitable because of the use of dithering, which is basically one type of area gradation.

SUMMARY OF THE INVENTION

Therefore, an object of the present invention is to provide a color image forming apparatus enabling high resolution image formation using laser power modulation without requiring a screening process during color image formation.

During laser power modulation, this apparatus can also control the laser power with high precision.

In addition, this apparatus can also detect with high precision that the laser has reached a predetermined location by regulating the laser power to a specific value.

To achieve this object, a color image forming apparatus according to the present invention comprises a plurality of color image forming arrangements, each arrangement comprising: image signal processing means for processing an image signal at a particular color and for producing a modulated image signal; semiconductor laser means for emitting laser beam in accordance with said modulated image signal; photoconductor means; scanning means for scanning the laser beams on said photoconductor means; and laser beam reforming means provided between said semiconductor laser means and said photoconductor means for reforming the laser beam to have a cross-section shape of an ellipse with a short axis thereof parallel to the laser scanning direction.

By means of this configuration, each of the color images is formed simultaneously, a full-color image can be formed at high speed by overlaying each of the single color images to the recording medium, and tonal gradations can be reproduced with a density gradation method using power modulation of the laser beams. As a result, the screening process required to prevent errors in the relative positions of each color from affecting a shift in color tones, i.e., the processing required to compensate for the problem of the conventional color image forming apparatus comprising plural photoconductors as described above, is not required in the device according to the present invention. As a result, high resolution color images that are free of the resolution loss caused by this screening process can be formed.

It is also possible to control the laser power with high precision during power modulation of the laser beam.

BRIEF DESCRIPTION OF THE DRAWINGS

The present invention will become more fully understood from the detailed description given below and the accompanying diagrams wherein.

DETAILED DESCRIPTION OF THE PREFERRED EMBODIMENTS

Figure 1:
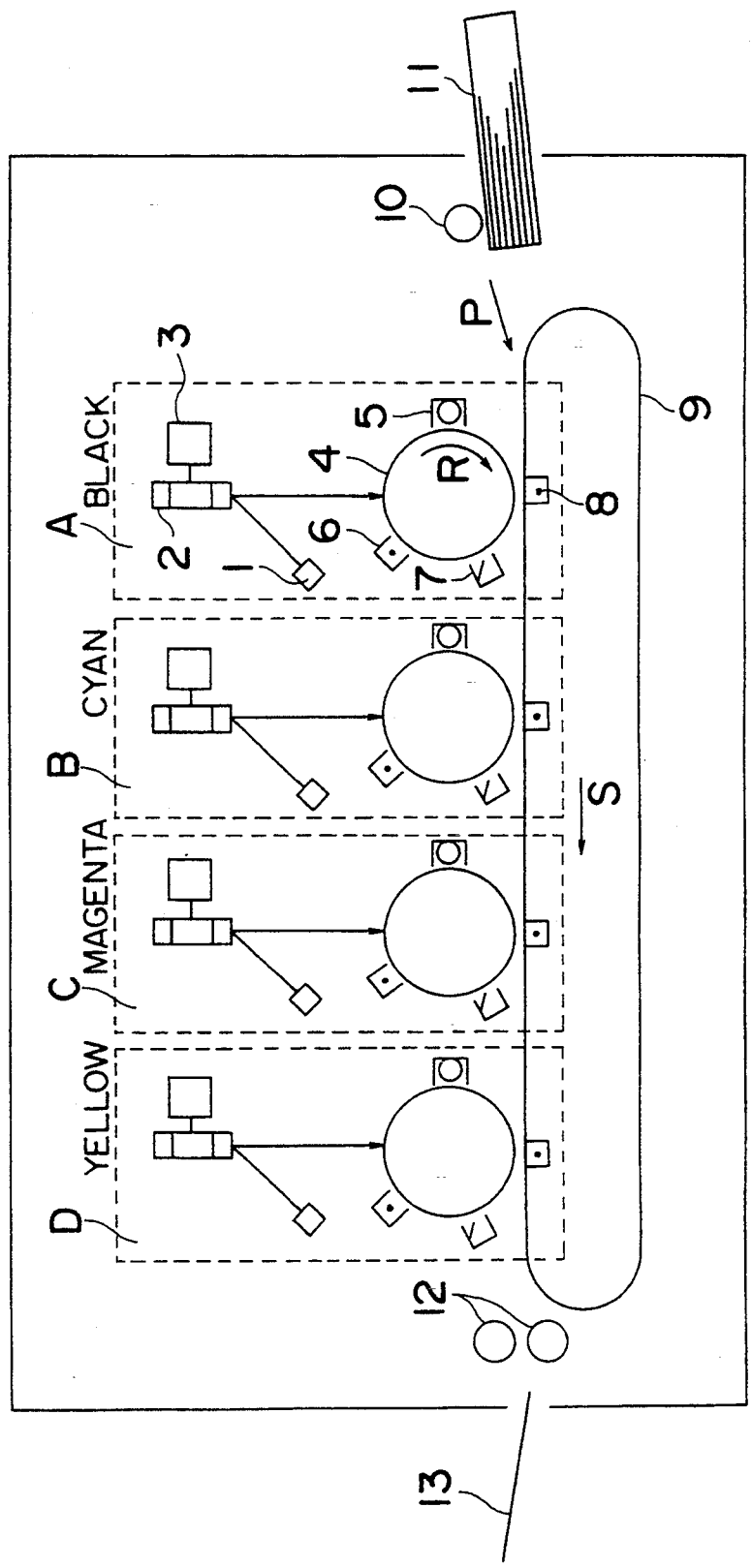
FIG. 1 is a block diagram of an electrostatic imaging color printer according to the preferred embodiment of the invention.

The preferred embodiments of the present invention are described hereinbelow with reference to the accompanying figures, of which FIG. 1 is a block diagram of an electrostatic imaging color printer according to the first embodiment of the invention.

The color printer unit forms a full-color image by overlaying toner images of black Bk, cyan C, magenta M, and yellow Y. For each of the four colors, Bk, C, M and Y, photoconductor drum 4 and parts associated therewith are provided.

A polygon mirror 2 is driven by a polygon motor 3 so that the laser beam emitted by a semiconductor laser 1 is reflected off the polygon mirror 2 and scans a photoconductor drum 4. The photoconductor drum 4 rotates in the direction of the arrow, and an electrostatic latent image corresponding to the laser beam intensity is formed on the surface of the photoconductor drum 4. As shown in FIG. 1, a developer 5 develops the latent image on the photoconductor drum 4 surface with the black Bk toner, resulting in the toner image.

A paper feed roller 10 feeds one sheet of copy paper stocked in a paper tray 11 into the printer in the direction of arrow P. A transport belt 9 rotates in the direction of arrow S to carry the supplied paper through the printer. A transfer charger 8 transfers the toner image formed on the photoconductor drum 4 to the copy paper on the transport belt 9, which carries the copy paper at a linear speed equivalent to the rotational speed of the photoconductor drum 4. A cleaner 7 cleans the photoconductor drum 4 by recovering any residual toner left on the photoconductor drum 4, and a main charger 6 uniformly charges the photoconductor drum 4 before the drum is again exposed to the laser beam. This image forming process is the same image forming process used in the photostatic copiers commonly available today.

Each of the imaging units A, B, C, and D is similarly constructed, consisting of the semiconductor laser 1, polygon mirror 2, polygon motor 3, photoconductor drum 4, developer 5, main charger 6, cleaner 7, and transfer charger 8. The imaging units A, B, C, and D differ in the color of the toner used to develop the image, specifically black Bk, cyan C, magenta M, and yellow Y, respectively. As the copy paper is carried through the printer, the BK, C, M, and Y toner images are successively transferred to and a full-color image is gradually formed on the paper.

A fixing unit 12 then fixes the combined toner images on the paper, and the paper is deposited in an output tray 13.

Figure 2:
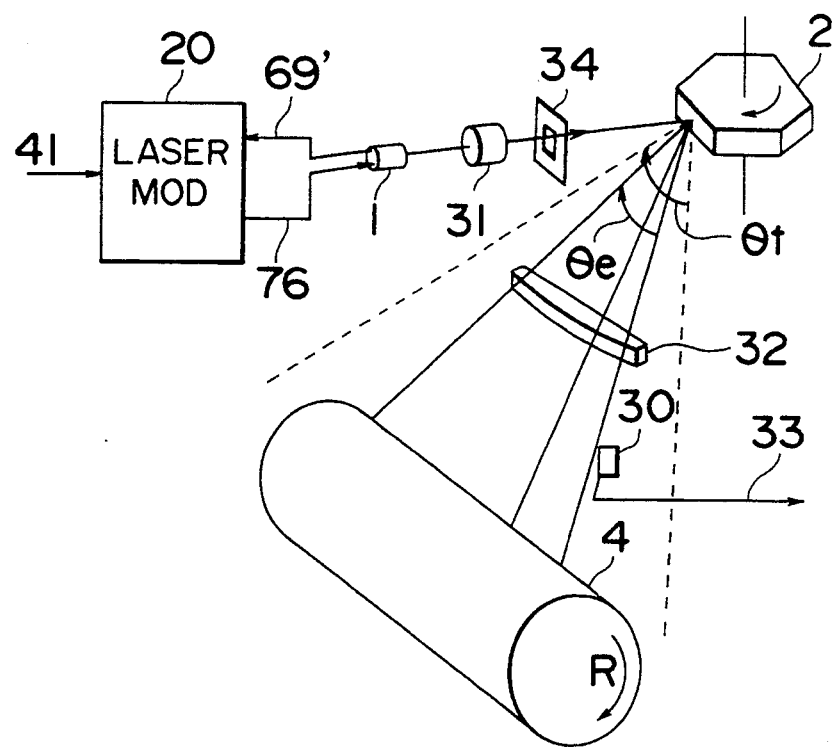
FIG. 2 is a detailed block diagram of imaging unit shown in FIG. 1.

FIG. 2 shows a detailed block diagram of imaging unit A shown in FIG. 1. The power modulated laser beam emitted from the semiconductor laser 1 is collimated by the collimator lens 31, reflected by the rotating polygon mirror 2 through the f$\theta$ lens 32 for f$\theta$ correction, and then scans the photoconductor drum 4.

As described above, the photoconductor drum 4 rotates in direction R so that an electrostatic latent image is formed on the surface of the photoconductor drum 4. The toner image is formed on the photoconductor drum 4 using a photostatic imaging method of common knowledge according to the latent image on the photoconductor drum 4. A PIN photodiode 30 is provided near the line scanning start position of the laser beam to detect each laser beam line scan and output the beam detection signal 33. The beam detection signal 33 flags the start of a line scan by the laser beam. The beam from the rotating polygon mirror 2 actually scans at a wide angle $\theta t$, but the image data is carried only when the beam is scanning at an effective angle $\theta e$.

First Embodiment

Figure 3:
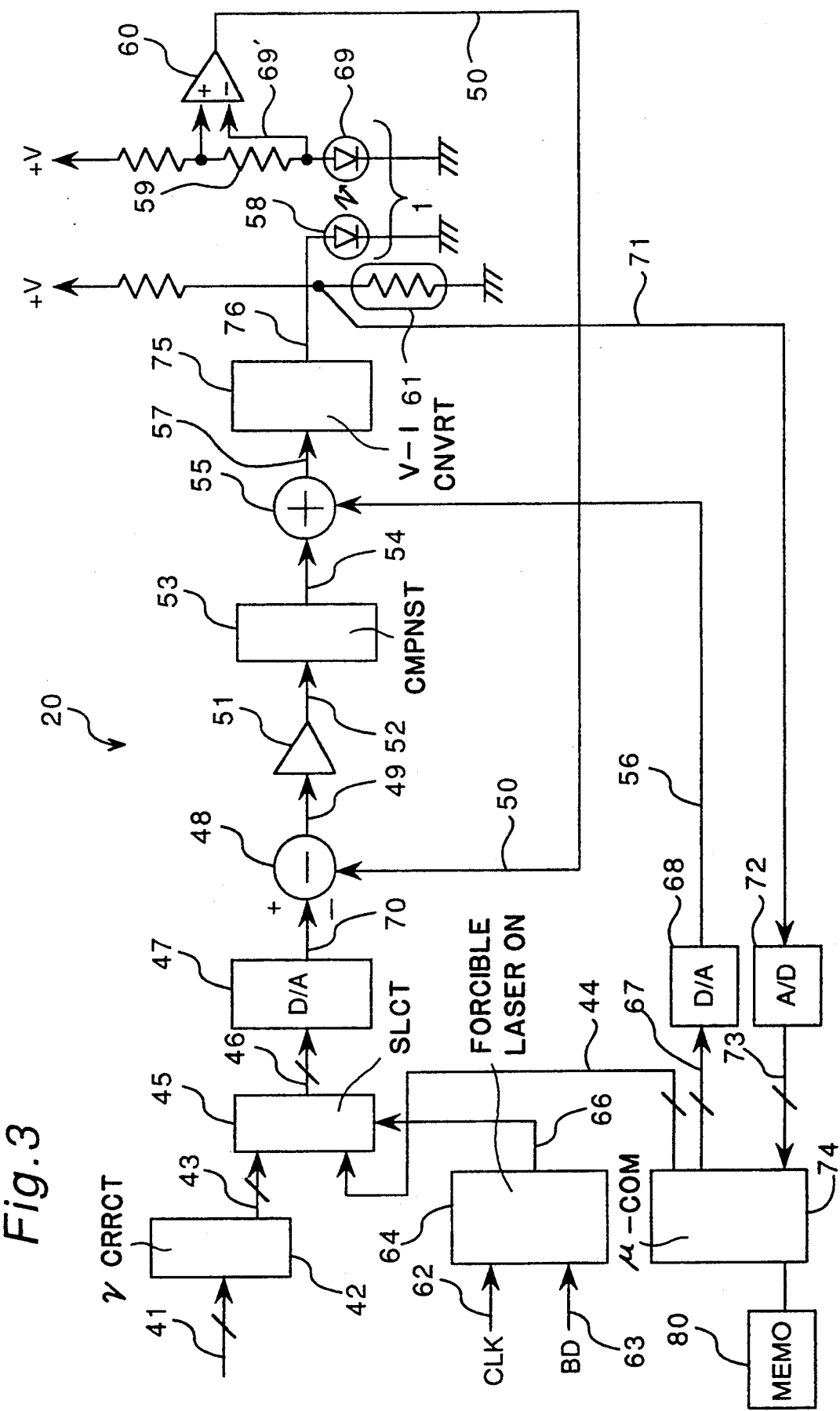
FIG. 3 is a block diagram of the laser modulation circuit according to a first embodiment of the invention.

FIG. 3 is a block diagram of the laser modulation circuit 20 in the first embodiment of the invention. It is to be noted that four laser modulation circuit 20 as shown in FIG. 3 are provided because there are four semiconductor lasers provided in the color printer shown in FIG. 1. The operation of the laser modulation circuit 20 of the color image forming apparatus according to the present invention is described below with reference to FIG. 3.

An 8-bit digital image signal 41 is applied to a gamma ($\gamma$) correction circuit 42. The 8-bit digital image signal 41 is synchronized with the beam detect signal 33 so that the image signal is present only during the period when the laser beam scans in the effective angle $\theta e$. When the image signal is not present, a blank signal (zero level signal) is present in the 8-bit digital image signal 41. The gamma ($\gamma$) correction circuit 42 applies digital/digital correction to the input 8-bit digital image signal 41 to correct the gradation characteristics of the print image. The $\gamma$ correction circuit 42 in this embodiment is a memory-based look-up table. The $\gamma$ corrected image signal 43 and a set data 44 having a predetermined level are input to the selector 45. The set data 44 is formed in a microprocessor 74. A forcible laser power ON signal 66 output from the forcible laser power ON circuit 64 is also input to the selector 45.

The selector 45 selects the set data 44 when the forcible laser power ON signal 66 is HIGH, selects the gamma corrected image signal 43 when the forcible laser power ON signal 66 is LOW, and outputs the selected signal to the D/A converter 47.

A timing for producing a HIGH level signal from the forcible laser power ON circuit 64 is explained. The beam detection signal 33 as produced from PIN photodiode 30 has its waveform shaped to a line synchronization signal BD 63. In response to the line synchronization signal BD 63, circuit 64 counts, using a clock signal CLK 62, a predetermined time (Ts-$\Delta$T) which is equal to one cycle laser scan period Ts minus a very short period $\Delta$T. One cycle laser scan period Ts is equal to a time length from a moment when the laser beam is at one standard position, such as at the PIN photodiode 30, to a moment when the laser beam is at the same standard position after one complete scan. After the predetermined time (Ts-$\Delta$T) from the detection of the line synchronization signal BD 63, a HIGH level signal 66 is produced from circuit 64 so that selector 45 starts to select the set data 44. Thus, the semiconductor laser 1 produces a predetermined laser beam which has enough high power for the PIN photodiode 30 to detect the laser beam. When the PIN photodiode 30 detects a laser beam, the beam detection signal 33 is produced, and in turn, the line synchronization signal BD 63 is applied to the forcible laser power ON circuit 64. Thus, circuit 64 starts counting the predetermined time (Ts-$\Delta$T) during which a LOW level signal 66 is produced from circuit 64 so that selector 45 selects image signal 43. Accordingly, starting from a moment when the laser beam is at the PIN photodiode 30, selector 45 selects the image signal 43 for a period (Ts-$\Delta$T), then, selector 45 selects the set data 44 for a period $\Delta$T, thus completing one laser scan cycle. The forcible laser power ON circuit 64 itself will be described in further detail later in connection with FIGS. 6a and 6b.

A first D/A converter 47 converts the selector 45 output 46 to a voltage-converted image signal 70, specifically 0 V when the input data is 0, and 1 V when the input data is FF (hexadecimal number system) and between 0 and 1 V relatively to the input data which is between 0 and FF.

A subtracter 48 subtracts the voltage of a laser power detection signal 50 from the voltage of the voltage-converted image signal 70 to output an error signal 49. An amplifier 51 amplifies the error signal 49, thus determining the gain of the laser power feedback loop. A compensation circuit 53 applies phase compensation and integration compensation to the amplified output 52 to stabilize the feedback loop and reduce residual error.

A second D/A converter 68 converts the laser bias current setting data 67 from the microprocessor 74 to a voltage 56, as will be described later.

An adder 55 adds the output 54 from the compensation circuit 53 and output 56 from the D/A converter 68, and provides the voltage sum 57 to the voltage-current conversion circuit 75 for conversion to a current signal. The output current 76 of the voltage-current conversion circuit 75 is then input to the laser diode 58 (semiconductor laser).

Figure 4:
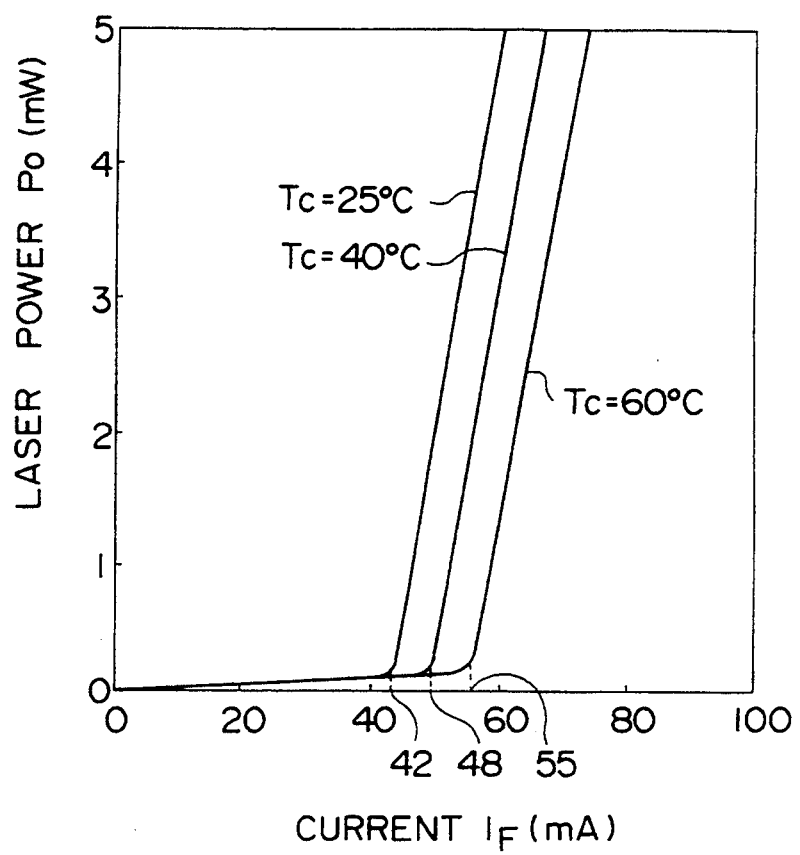
FIG. 4 is a graph of the laser output power characteristics of the laser diode relative to the forward current, and of the temperature dependency of these characteristics.
Figure 15:
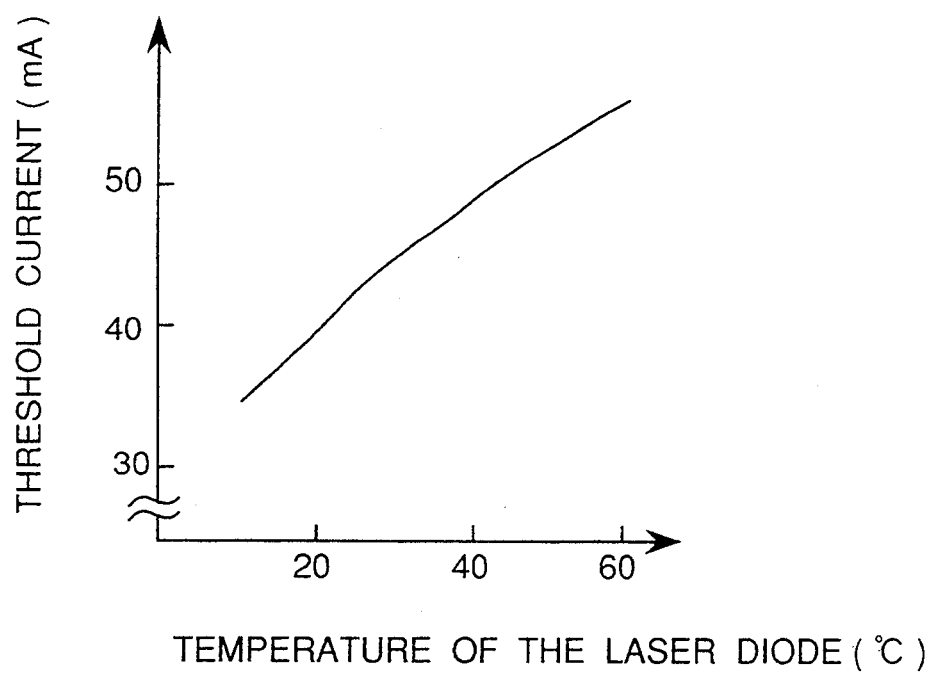
FIG. 15 is a graph showing a relationship between the temperature of the laser diode and the laser emission threshold current.

FIG. 4 is a graph of the laser output power characteristics of the laser diode 58 relative to the forward current, and of the temperature dependency of these characteristics. As will be known from FIG. 4, the output power of the laser diode 58 is generally zero below a certain input current level, and above this level the output power is proportional to the current level. This current level is called a laser emission threshold current. It should also be noted that the laser emission threshold current varies according to the temperature of the laser diode 58. For example, when the temperature of the laser diode 58 is 25° C., the laser emission threshold current is 42 mA; when the temperature is 40° C., the laser emission threshold current is 48 mA; and when the temperature is 60° C., the laser emission threshold current is 55 mA. The laser emission threshold currents for other temperatures are shown in the graph of FIG. 15.

Referring again to FIG. 3, the photodiode 69 monitors the laser beam output from the laser diode 58, and outputs a current proportional to the laser power. The photodiode 69 and laser diode 58 are housed in the same case so as to define a semiconductor laser 1 shown in FIGS. 1 and 2. The a voltage across a current detection resistance 59 is proportional to a current flowing through photodiode 69. The differential amplifier 60 amplifies the potential difference across the current detection resistance 59, and outputs the laser power detection signal 50, which is so regulated to be 1 V when the laser power is 5 mW.

By thus monitoring the laser beam output and feeding the monitor signal back into the current supplied to the laser diode, the laser diode can be regulated to maintain stable laser power modulation even though the forward current laser output characteristics of the laser diode may vary irregularly.

A laser bias current setting data 67 is applied to the adder 55 so that the laser drive current 76 is biased by a current approximately equal to the laser emission threshold current, as will be described in detail below.

A thermistor 61 shown in FIG. 3 is attached to the laser diode 58 casing to detect the case temperature. Because the thermistor 61 resistance varies with temperature, the temperature of the laser diode 58 can be determined from the thermistor 61 potential signal 71. The potential signal 71 is input to the A/D converter 72 for conversion to a digital signal 73. The digital signal 73 is applied to the microprocessor 74, which determines the laser diode 58 temperature from this digital signal 73.

The microprocessor 74 computes the bias current from the known temperature dependency characteristics of the laser diode 58 laser emission threshold current, and produces the laser bias current setting data 67.

Figure 14:
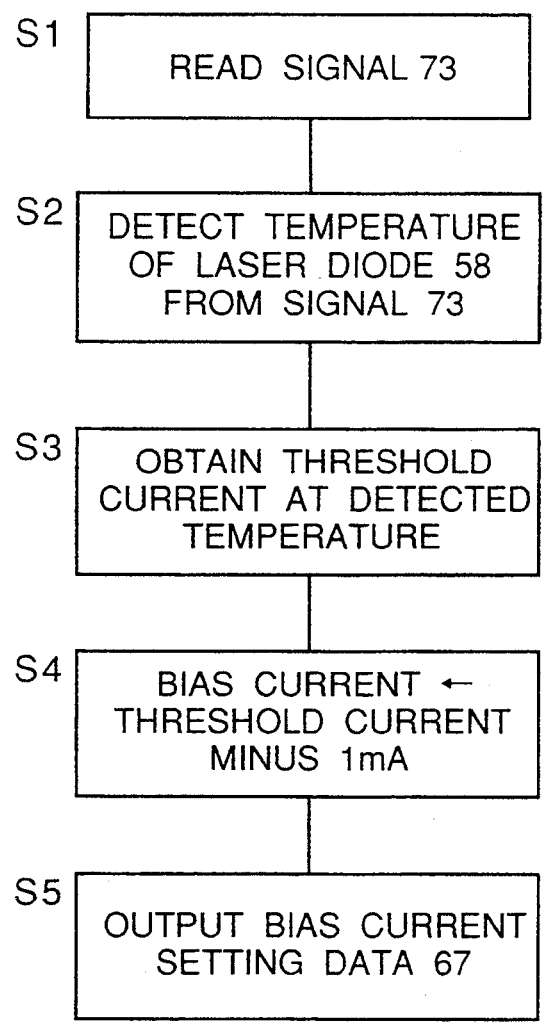
FIG. 14 is a flow chart showing an operation of the microcomputer used in FIG. 3.

The operation carried out in the microcomputer 74 is shown in FIG. 14. At step S1, digital signal 73 is read, and at step S2, the temperature of the laser diode 58 is detected based on the detected digital signal 73. At step S3, based on the temperature of the laser diode 58, a laser emission threshold current at the detected temperature is calculated or obtained from a table. To this end, a memory 80 having a table carrying data shown in FIG. 15 is provided in association with microcomputer 74. At step S4, a bias current is calculated by subtracting 1 mA from the detected laser emission threshold current. Other calculation may be used for obtaining the bias current. Then, at step S5, a bias current setting data 67 corresponding to the obtained bias current is set and outputted from the microcomputer 74.

As a result, changes in the laser emission threshold current resulting from a change in the laser diode temperature can be compensated for by detecting the laser diode temperature, calculating the laser emission threshold current, and setting the bias current applied to the laser diode accordingly. This makes it possible to continuously maintain a good response and correlation between the laser output and the laser diode current.

Second Embodiment

Figure 5:
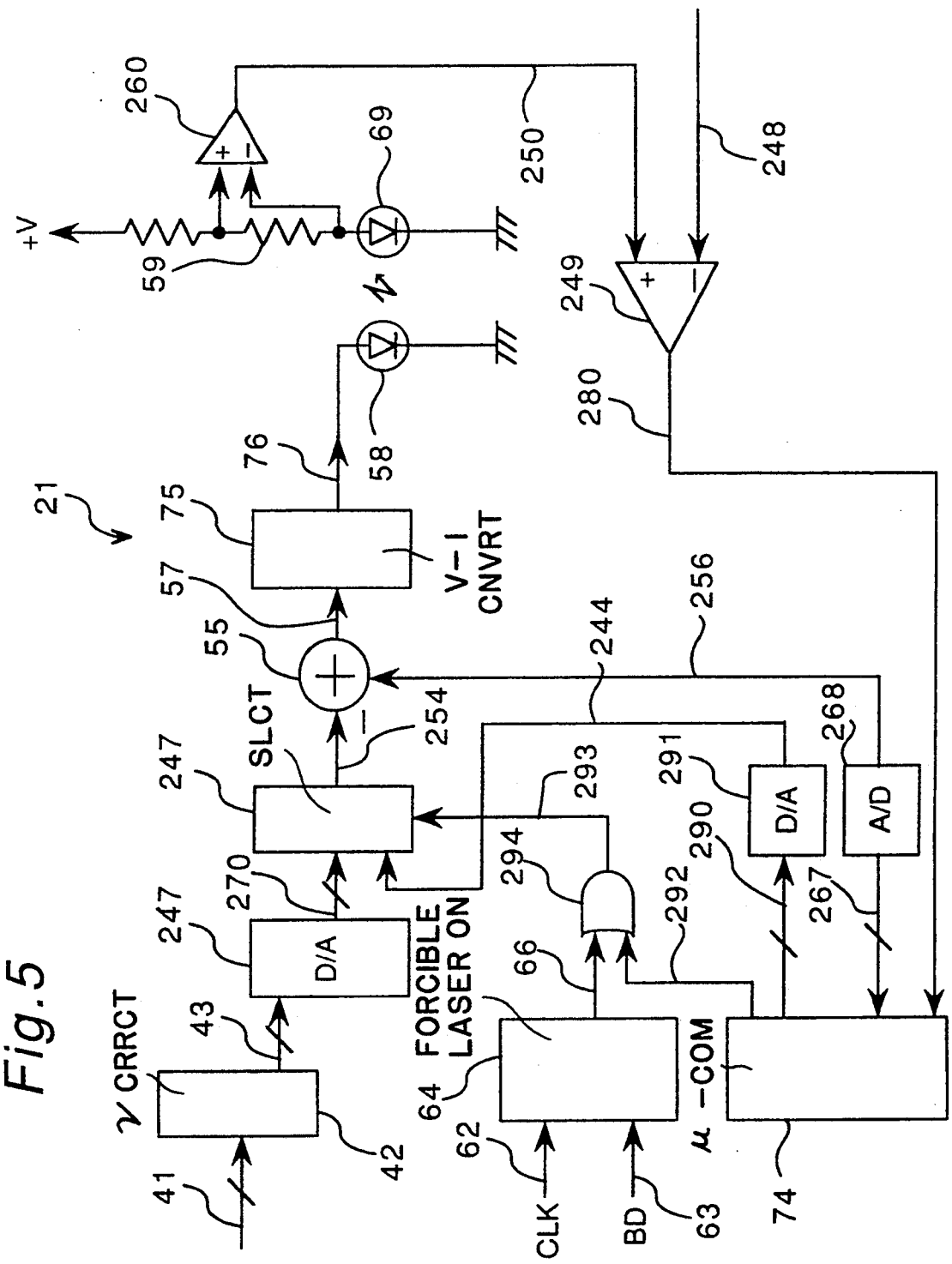
FIG. 5 is a block diagram of the laser modulation circuit according to a second embodiment of the invention.

FIG. 5 is a block diagram of the laser modulation circuit 21 in the second embodiment of the invention. The laser modulation circuit 21 for a color image forming apparatus according to the second embodiment of the invention is described below. It is to be noted that like parts are referenced by like numerals in FIGS. 3 and 5.

The gamma ($\gamma$) correction circuit 42 applies digital/-digital correction to the input 8-bit digital image signal 41 to correct the gradation characteristics of the print image. The D/A converter 247 converts the resulting gamma corrected image signal 43 to a voltage, specifically 0 V when the corrected image signal 43 is 0, and 1 V when FF. A second D/A converter 291 converts the data from one of the microprocessor 74 output ports to a voltage 244. The output voltage 270 from the D/A converter 247 and the voltage 244 from the D/A converter 291 are input to the multiplexer 245.

The multiplexer 245 selects the voltage 244 from the microprocessor 74 when the OR gate 294 output signal 293 is HIGH, and selects the voltage 270 from the input-side D/A converter 247 when the gate signal 293 is LOW.

The OR gate 294 outputs as the gate signal 293 either the one microprocessor 74 output signal 292 or the forcible laser power ON signal 66 from the forcible laser power ON circuit 64. The gate signal 293 is always HIGH regardless of the forcible laser power ON signal 66 state when the input signal 292 from the microprocessor 74 is HIGH. This output signal 292 is regulated by the microprocessor 74 to be LOW during image formation.

When the laser is incident upon the PIN photodiode 30 shown in FIG. 2, the laser power is set to the predetermined power level determined by the voltage 244 output from the microprocessor 74.

The line synchronization signal BD 63 (the wave-shaped beam detection signal 33 output from the PIN photodiode 30) and the clock signal CLK 62 (used to count the time after the line synchronization signal BD 63 is input) are input to the forcible laser power ON circuit 64. The forcible laser power ON signal 66 output by the forcible laser power ON circuit 64 is HIGH when the laser beam is incident to the PIN photodiode 30, and is LOW when the laser beam is modulated based on the image signal. The forcible laser power ON circuit 64 itself is described in further detail below.

The D/A converter 291 converts the data 290 from the microprocessor 74 output port to an analog voltage 244. During image formation, this data 290 is set by the microprocessor 74 to the laser power level when the laser is incident to the PIN photodiode 30.

The other D/A converter 268 converts the laser bias current setting data 267 output from the microprocessor 74 to a voltage.

The adder 55 adds the multiplexer 245 output voltage 254 and the D/A converter 268 output voltage 256, and inputs the voltage sum to the voltage-current conversion circuit 75 for conversion to a current. As in the first embodiment, the voltage-current conversion circuit 75 output current 76 is input to the laser diode 58 (semiconductor laser).

The laser bias current setting data 267 sets the bias current of the laser diode 58 at approximately the laser emission threshold current level of the laser diode 58.

The photodiode 69 monitors the laser beam output from the laser diode 58, and outputs a current proportional to the laser power. The current detection resistance 59 produces a potential difference proportional to the current flowing to the photodiode 69 at both ends. The differential amplifier 260 amplifies the potential difference at both ends of the current detection resistance 59, and outputs the laser power detection signal 250.

The comparator 249 compares the laser power detection signal 250 and a setting voltage signal 248 input from an external source, and outputs a HIGH signal 280 when the laser power detection signal 250 is greater than the setting voltage signal 248. The setting voltage signal 248 is set to be equivalent to the laser power detection signal 250 voltage when the laser power is 1 mW. The comparator 249 output signal 280 is input to the microprocessor 74.

When an image is not being formed, the microprocessor 74 sets the signal 292 HIGH and the data 290 to zero. As a result, the multiplexer 245 output voltage 254 is 0 V, and the laser diode 58 current is determined by the voltage of the voltage 256 determining the laser beam current set by the microprocessor 74.

The microprocessor 74 sequentially increases the voltage 256 from a low voltage to a high potential by changing the laser bias current setting data 267. Note that the microprocessor 74 also monitors the comparator output signal 280, and when the comparator signal 280 changes from a LOW to a HIGH level, the microprocessor 74 obtains the laser bias current setting data 267. The microprocessor 74 can also predict the laser emission threshold current of the laser diode 58 from the laser bias current setting data 267 when the comparator signal 280 changes from LOW to HIGH because the rate of change in the laser power relative to the forward voltage when the laser diode 58 emits is known. During image formation, the microprocessor 74 sets the laser bias current setting data 267 based on this predicted laser emission threshold current.

In operation, the laser modulation circuit 21 operates in two modes, a learning mode and an image processing mode. During the learning mode, microcomputer 74 produces gradually increasing signal 290 and, at the same time, a HIGH level signal 292 is produced to enable selector 245 to select the gradually increasing signal. By using the gradually increasing signal, a test operation is given to the semiconductor laser diode 58. When the gradually increasing signal is in a relatively low level, the semiconductor laser diode 58 does not produce any laser. When the gradually increasing signal is increased to a level corresponding to the laser emission threshold current, the semiconductor laser diode 58 starts to emit laser. Thereafter, the laser power will be increased relatively to the increase of the gradually increasing signal. The output power of the laser is monitored by differential amplifier 260 and is fed to comparator 249. Since comparator 249 is applied with a reference signal 248 corresponding to 1 mW laser power detected by the monitoring amplifier 260, comparator 280 produces a HIGH level signal when the gradually increasing signal is increased to a level necessary for the semiconductor laser diode 58 to produce 1 mW laser power. The microcomputer 74 detects the gradually increasing signal at the time when the HIGH level signal is produced from the comparator 249 and stores the detected level of the gradually increasing signal for use as a biasing current 256 in the following image processing mode.

As a result, it is possible to continuously maintain a good response and correlation between the laser output and the laser diode current because changes in the laser emission threshold current resulting from a change in the laser diode temperature can be compensated for by calculating the laser diode laser emission threshold current and setting the bias current applied to the laser diode during non-image formation periods.

Figure 6A:
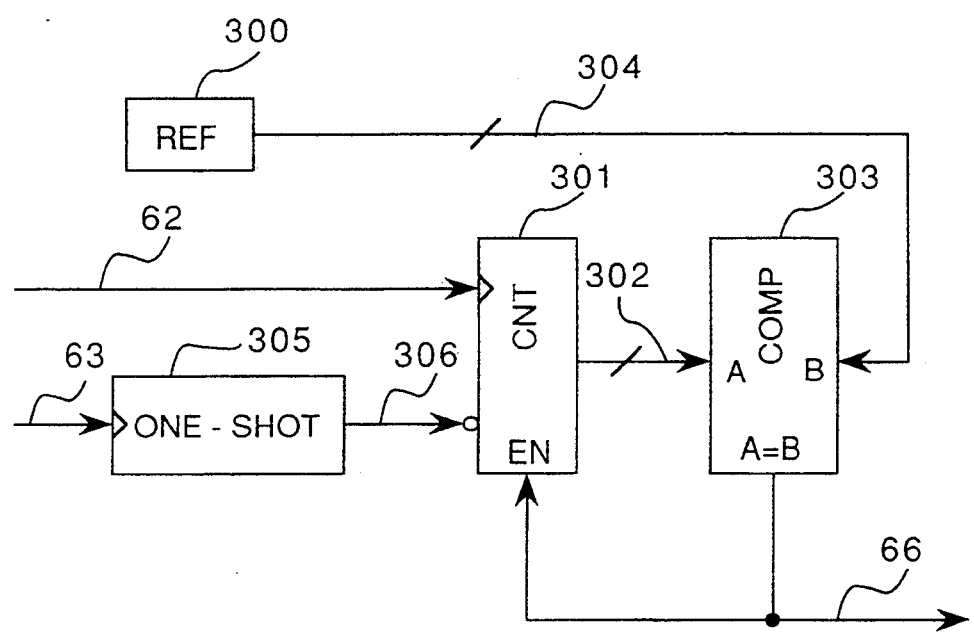
FIG. 6a is a block diagram of the forcible laser power ON circuit used in FIGS. 3 and 5.

Referring to FIG. 6a, a block diagram of the forcible laser power ON circuit 64 shown in FIGS. 3 and 5 is shown. The forcible laser power ON circuit 64 has a one-shot multivibrator 305, a counter 301, a comparator 303 and a reference generator 300.

Figure 6B:
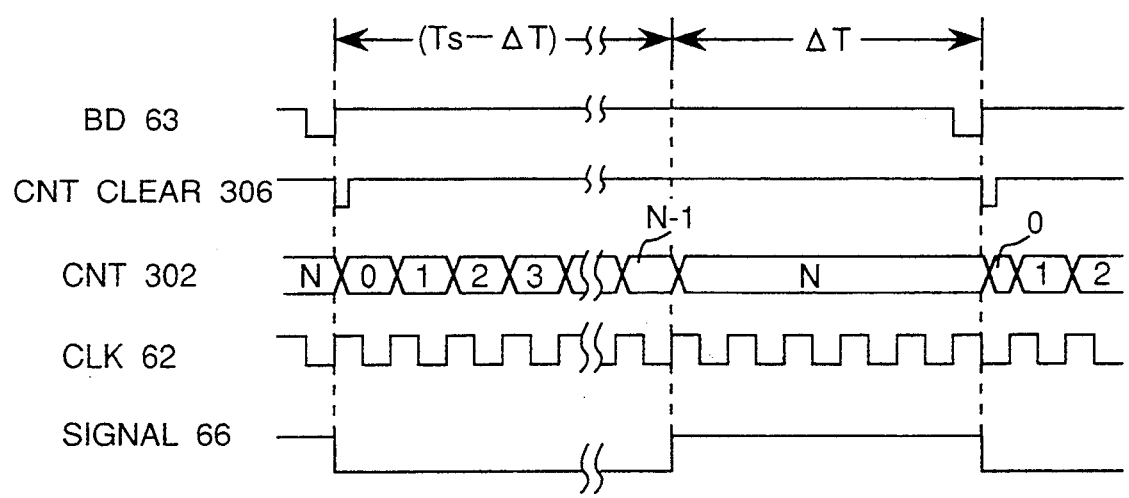
FIG. 6b is a graph showing waveforms obtained in the circuit of FIG. 6a, FIG. 7 is a graph of laser beam energy distribution when the laser beam spot is circular.

The line synchronization signal BD 63 is an active LOW level pulse signal applied to the trigger input terminal of the one-shot multivibrator 305, as shown in FIG. 6b. The one-shot multivibrator 305 outputs a LOW level signal 306 which is for clearing the counter 301. The LOW level signal 306 is a narrowspulse triggered by the line synchronization signal BD 63 rise edge. It is possible to eliminate one-shot multivibrator 305.

The counter clear signal 306 is input to the asynchronous clear terminal of the counter 301. The clock signal CLK 62 is input to the clock input terminal of the counter 301, which starts to count in response to the line synchronization signal BD 63 using clock 62 signal.

The comparator 303 compares the counted signal 302 with a predetermined signal 304 from a reference generator 300, and outputs a HIGH forcible laser power ON signal 66 when the two values are equal. The reference generator 300 generates a predetermined signal 304 which is substantially equal to above mentioned time (Ts-ΔT). The forcible laser power ON signal 66 is input to the count enable terminal EN of the counter 301, which stops counting in response to the leading edge of the HIGH level forcible laser power ON signal 66. The HIGH level forcible laser power ON signal 66 terminates in response to the trailing edge of the signal BD 63.

Because the period of the line synchronization signal BD 63 and the clock signal CLK 62 are both known, the setting 304 is the count 302 immediately before the next line synchronization signal BD 63 is generated.

The relationship between the laser beam spot on the photoconductor and the resolution of the formed image is described next.

Figure 7:
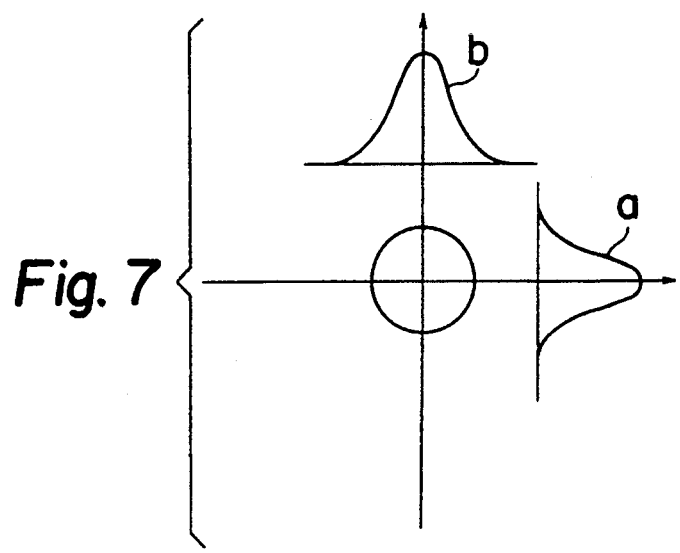

FIG. 7 is a graph of laser beam energy distribution when the laser beam spot is circular. Curve a in FIG. 7 shows the laser beam energy distribution perpendicular to the laser beam scanning direction, and b shows the energy distribution parallel to the scanning direction. Note that the energy distribution of the laser beam is basically a Gaussian distribution, and the same energy distribution is shown parallel and perpendicular to the scanning direction when the beam spot is circular.

Figure 8:
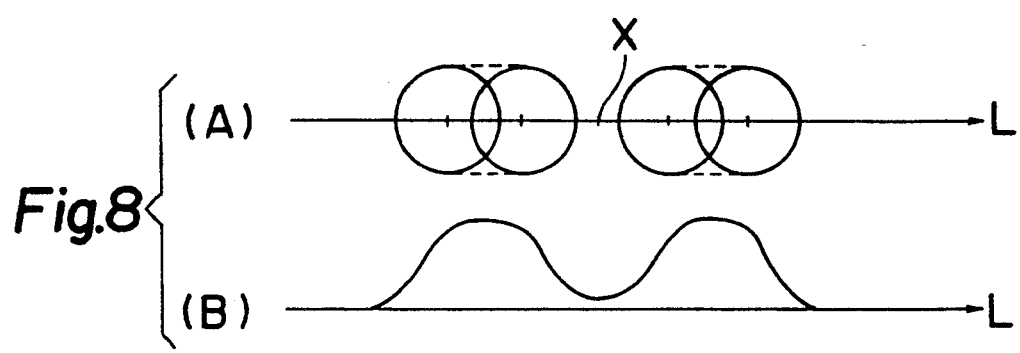
FIG. 8 is a graph of the irradiation energy distribution of the laser beam on the photoconductor when the laser beam spot is circular.

FIG. 8 is a graph of the irradiation energy distribution of the laser beam on the photoconductor when the laser beam spot is circular. The laser beam scanning direction is shown by arrow L. The movement of the beam spot when the laser power is modulated between maximum-zero-maximum each pixel equivalent time unit is shown in FIG. 8 (A), and the irradiation energy distribution of the laser beam on the photoconductor at the same time is shown in FIG. 8 (B). As will be known from this figure, the laser beam irradiation continues due to the laser beam energy distribution spread even though the laser power on the photoconductor at position X is zero. As a result, the potential contrast on the photoconductor drops and the resolution of the formed image deteriorates when the beam spot is circular.

Figure 9:
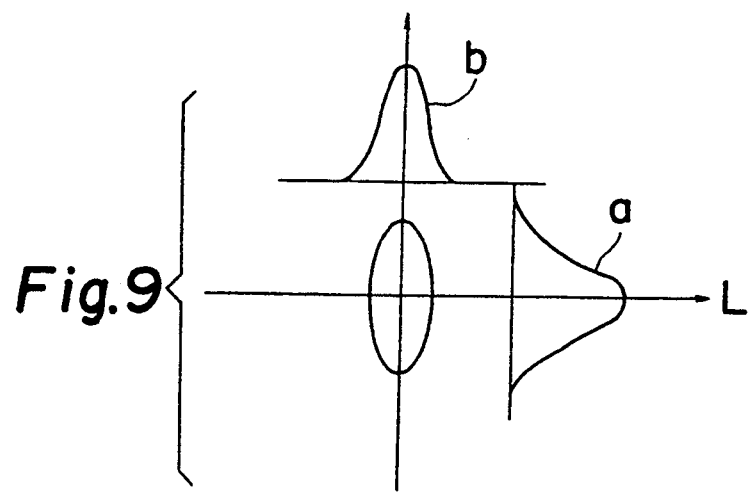
FIG. 9 is a graph of laser beam energy distribution when the laser beam spot is an ellipse.

FIG. 9 is a graph of laser beam energy distribution when the laser beam spot is an ellipse. The laser beam scanning direction is again shown by arrow L. Curve a shows the laser beam energy distribution perpendicular to the laser beam scanning direction, and b shows the energy distribution parallel to the scanning direction.

Figure 10:
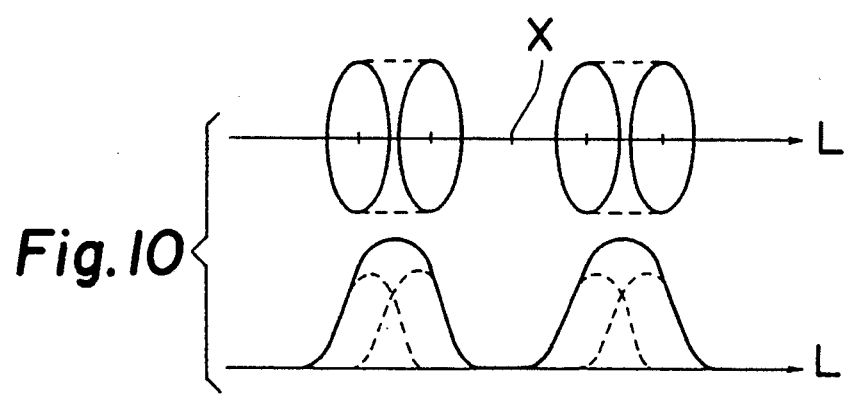
FIG. 10 is a graph of the irradiation energy distribution of the laser beam on the photoconductor when the laser beam spot is an ellipse.
Figure 16:
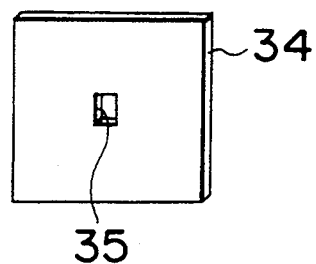
FIG. 16 is a perspective view of a mask used for making a laser beam with an ellipse cross-section.

FIG. 10 is a graph of the irradiation energy distribution of the laser beam on the photoconductor when the laser beam spot is an ellipse. The laser beam scanning direction is shown by arrow L. The movement of the beam spot when the laser power is modulated between maximum-zero-maximum each pixel equivalent time unit is shown in FIG. 10 (A), and the irradiation energy distribution of the laser beam on the photoconductor at the same time is shown in FIG. 10 (B). As will be known from this figure, the laser beam irradiation is zero when the laser power on the photoconductor at position X is zero. As a result, the potential contrast on the photoconductor can be increased and the resolution of the formed image improved when the beam spot on the photoconductor is an ellipse with its short axis parallel to the beam scan direction L. The laser beam with such an ellipse spot can be obtained by locating a mask 34 (FIG. 16) with an elongated opening 35 at position between collimator lens 31 and polygon mirror 2, shown in FIG. 2. Thus, the laser beam that has passed through the mask 34 is reformed such that a crosssection of the laser beam has a shape of ellipse.

The size of the laser beam spot on the photoconductor is described next.

Figure 11:
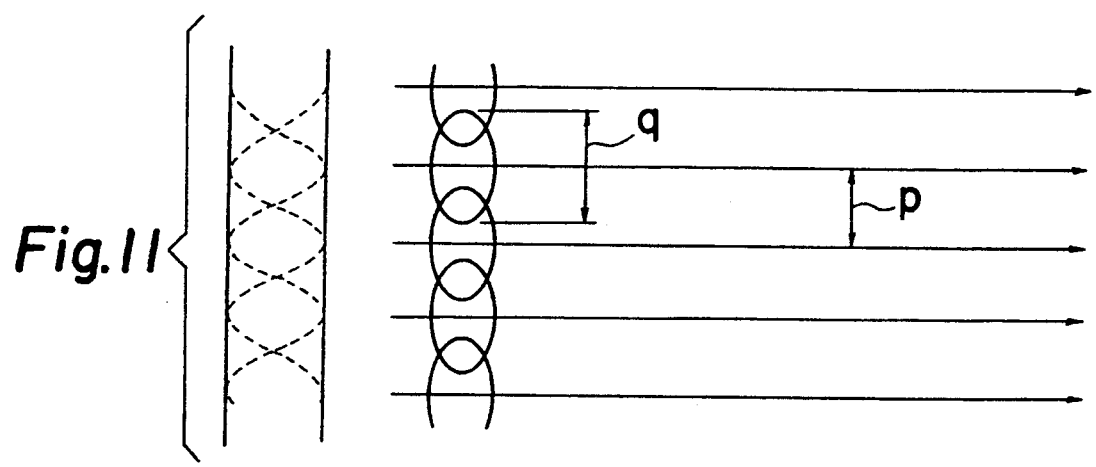
FIG. 11 is a graph of laser beam spot movement and the irradiation energy distribution of the laser beam.
Figure 12:
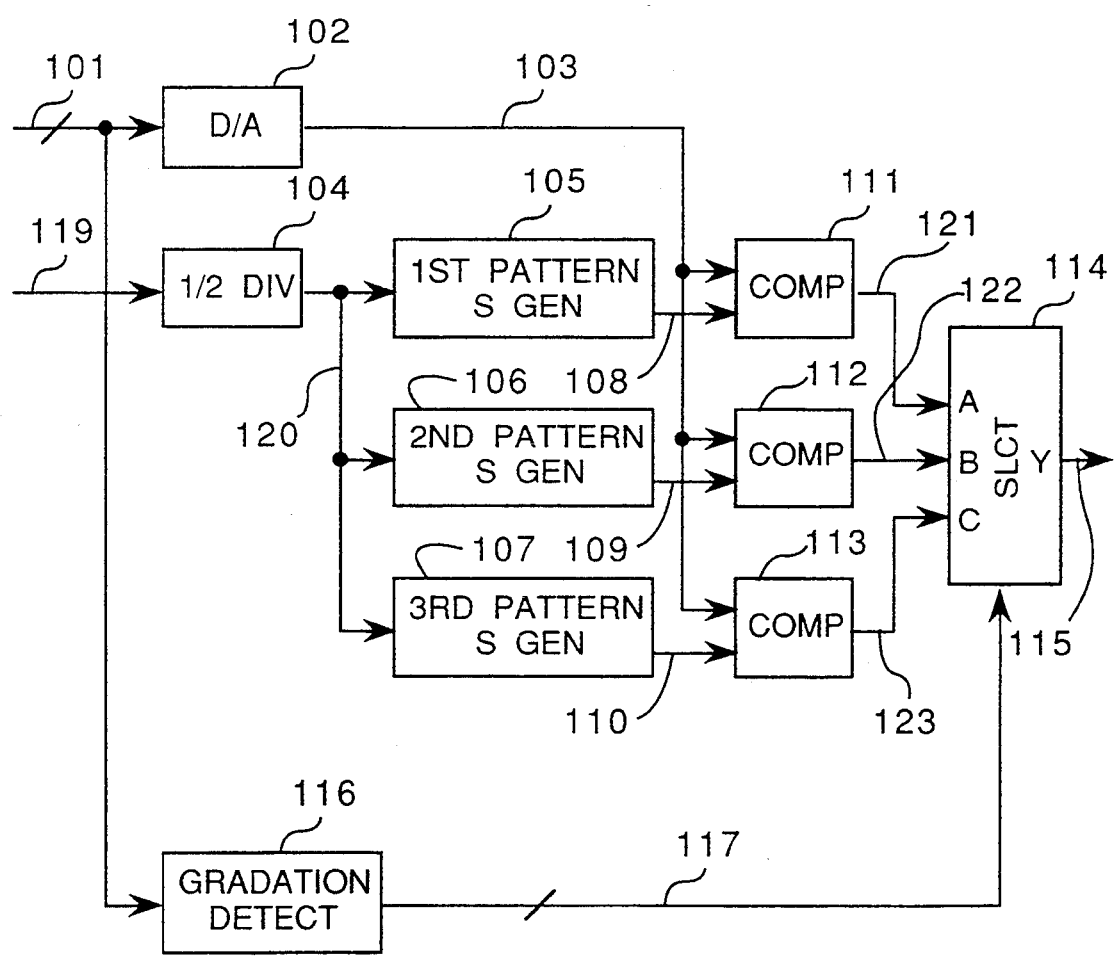
FIG. 12 is a block diagram of a prior art laser modulation circuit.
Figure 13:
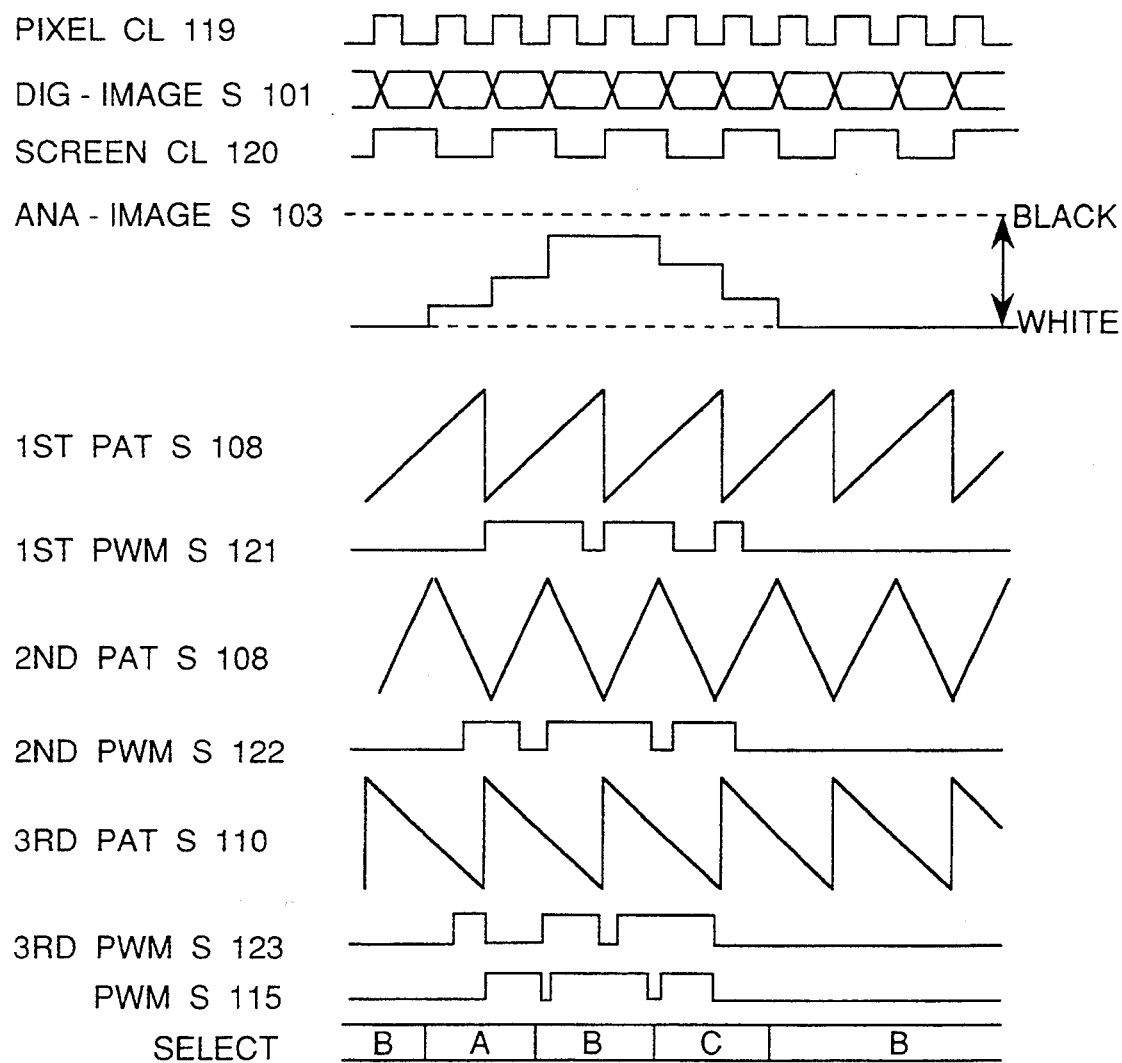
FIG. 13 is a graph showing timing chart of the laser modulation circuit using prior art pulse width modulation.

FIG. 11 is a graph of laser beam spot movement and the irradiation energy distribution of the laser beam. The laser beam scanning direction is shown by the arrows, and the ovals indicate the laser beam spot. The pitch between scan lines is "p", and the spot diameter of the laser beam perpendicular to the scanning direction is "q". The laser beam spot diameter is defined as a value obtaining $1/e^2$ the peak power of the laser beam. In FIG. 11 result of laser spot movement after scanning plural lines on the photoconductor at a constant laser power is shown by a plurality of ellipses aligned vertically. The degree of overlap between the adjacent laser beam spots is determined such that $$q/p = 1.6 \text{ through } 1.8. \qquad (1)$$

Under this condition, obtained irradiation energy distribution of the laser beam is shown at the left side of FIG. 11 in which the dotted line shows the energy distribution of each ellipse spot and real line shows the added energy distribution. As apparent from the energy distribution shown in the real line, when the laser beam spot diameter q is set somewhere between 1.6 and 1.8 times the scan line pitch p, that is to satisfy equation (1), the energy distribution of the laser beam on the photoconductor perpendicular to the scanning direction can be made uniform.

This is the condition for reproducing a uniform image at maximum density without irregularities in the formed image.

According to the present invention, since there are plural photoconductor drums, and since the half-tone images can be formed by changing the strength of the laser beam, the color deviations caused by the registration error of each color can be corrected without any processing on the screen. Thus, a color image with a high resolution which does not take any affect from the screen processing can be obtained.

In addition, by making the laser beam spot diameter q larger than the scan line pitch p, variations in the energy distribution of the laser beam on the photoconductor perpendicular to the scanning direction can be suppressed even when forming half-tone images by lowering the laser power below that illustrated in FIG. 11. Because uniform density half-tone images can be thus formed, the screening process required in conventional color image forming apparatuses is not needed when forming full-color images by means of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color image forming apparatus with plural photoconductor drums comprising:
   a plurality of color image forming arrangements, each arrangement comprising:
   image signal processing means for processing an image signal at a particular color and for producing a modulated image signal having a level which changes linearly from a minimum to a maximum;
   semiconductor laser means for emitting a laser beam in accordance with said modulated image signal;
   photoconductor means; and
   scanning means for scanning the laser beam on said photoconductor means.

2. A color image forming apparatus as claimed in claim 1, further including laser beam reforming means for reforming the laser beam such that a diameter of a laser beam spot measured on the photoconductor means perpendicular to the direction of laser scanning is set between 1.6 and 1.8 times a scanning pitch of the laser beam on said photoconductor means.

3. A color image forming apparatus as claimed in claim 1, wherein said image signal processing means comprises:
   temperature detecting means for detecting the temperature of said semiconductor laser means;
   obtaining means for obtaining a laser emission threshold current of said semiconductor laser means relatively to the detected temperature;
   bias current calculation mean for calculating a bias current based on said obtained laser emission threshold current; and
   adding means for adding said bias current to said image signal.

4. A color image forming apparatus as claimed in claim 1, wherein said image signal processing means comprises:
   laser power monitoring means for monitoring a power of the laser beam and for producing a monitor signal; and
   feedback means for feeding the monitor signal back to said image signal to control the laser output to make said monitor signal substantially equal to said image signal.

5. A color image forming apparatus as claimed in claim 1, wherein said image signal processing means comprises:
   gradually increasing signal generating means for generating a gradually increasing signal which is applied to said semiconductor laser means;
   laser power monitoring means for monitoring a power of the laser beam relatively to the increase of said gradually increasing signal and for producing a monitor signal;
   power detecting means for detecting a laser power and for producing a detect signal when said detected laser power has reached a predetermined level;
   memory means for storing a level of the gradually increasing signal when said detect signal is produced; and
   bias current supply means for supplying a bias current to said image signal, said bias current determined by said level of the gradually increasing signal stored in said memory means.

6. A color image forming apparatus as claimed in claim 1, further comprising:
   laser detection means for detecting whether the laser beam deflected by a deflection means reaches a predetermined position, and for producing a position detection signal;
   counter means for counting a predetermined time less than one scan period of said laser beam in response to said position detection signal;
   reference signal producing means for producing a reference signal; and
   selector means for selecting said image signal while said counter means is counting said predetermined time, and for selecting said reference signal after counting said predetermined time, said counter means being reset and start counting in response to said position detection signal, said selected signal being used for operating said semiconductor laser means.

7. A color image forming apparatus with plural photoconductor drums comprising:
   a plurality of color image forming arrangements, each arrangement comprising:

image signal processing means for processing an image signal at a particular color and for producing a modulated image signal having a level which changes linearly from a minimum to a maximum;

semiconductor laser means for emitting a laser beam in accordance with said modulated image signal;

photoconductor means;

scanning means for scanning the laser beam on said photoconductor means; and laser beam reforming means provided between said semiconductor laser means and said photoconductor means for reforming the laser beam to have a crosssection shape of an ellipse with a short axis thereof parallel to the laser scanning direction.

8. A color image forming apparatus as claimed in claim 7, wherein said laser beam reforming means reforms the laser beam such that a diameter of laser beam spot measured on the photoconductor means perpendicular to the direction of laser scanning is set between 1.6 and 1.8 times a scanning pitch of the laser beams on said photoconductors.

9. A color image forming apparatus as claimed in claim 7, wherein said image signal processing means comprises:

temperature detecting means for detecting the temperature of said semiconductor laser means;

obtaining means for obtaining a laser emission threshold current of said semiconductor laser means relatively to the detected temperature;

bias current calculation mean for calculating a bias current based on said obtained laser emission threshold current; and adding means for adding said bias current to said image signal.

10. A color image forming apparatus as claimed in claim 7, wherein said image signal processing means comprises:

laser power monitoring means for monitoring a power of the laser beam and for producing a monitor signal; and feedback means for feeding the monitor signal back to said image signal to control the laser output to make said monitor signal substantially equal to said image signal.

11. A color image forming apparatus as claimed in claim 7, wherein said image signal processing means comprises:

gradually increasing signal generating means for generating a gradually increasing signal which is applied to said semiconductor laser means;

laser power monitoring means for monitoring a power of the laser beam relatively to the increase of said gradually increasing signal and for producing a monitor signal;

power detecting means for detecting a laser power and for producing a detect signal when said detected laser power has reached a predetermined level;

memory means for storing a level of the gradually increasing signal when said detect signal is produced; and bias current supply means for supplying a bias current to said image signal, said bias current determined by said level of the gradually increasing signal stored in said memory means.

12. A color image forming apparatus as claimed in claim 7, further comprising:

laser detection means for detecting whether the laser beam deflected by a deflection means reaches a predetermined position, and for producing a position detection signal;

counter means for counting a predetermined time less than one scan period of said laser beam in response to said position detection signal;

reference signal producing means for producing a reference signal; and selector means for selecting said image signal while said counter means is counting said predetermined time, and for selecting said reference signal after counting said predetermined time, said counter means being reset and start counting in response to said position detection signal, said selected signal being used for operating said semiconductor laser means.

* * * * *